March 24, 1942.   G. A. KNEEDLER   2,277,552
AIR CONDITIONER
Filed Aug. 7, 1939   3 Sheets-Sheet 1

Inventor
George A. Kneedler,
By J. Stanley Burch
Attorney

March 24, 1942.  G. A. KNEEDLER  2,277,552
AIR CONDITIONER
Filed Aug. 7, 1939  3 Sheets-Sheet 2

Inventor
George A. Kneedler
J. Stanley Burch
Attorney

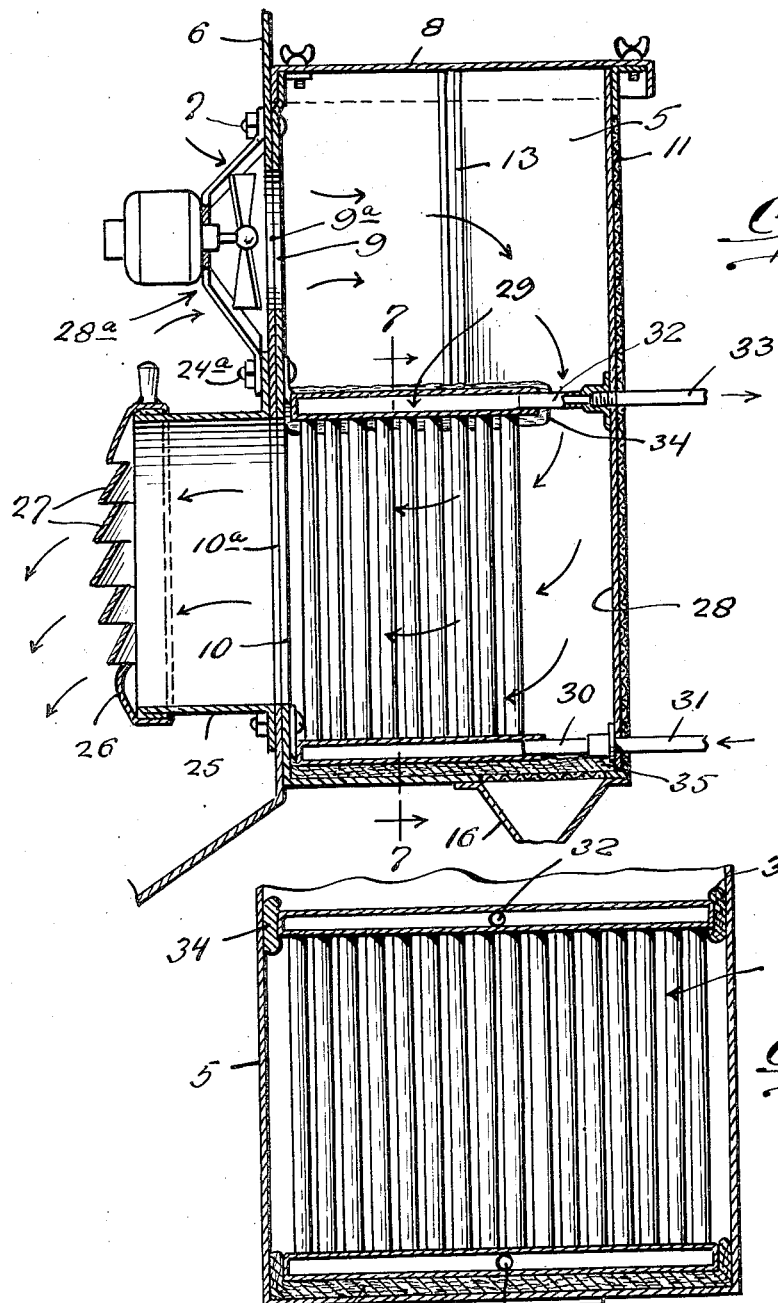

Patented Mar. 24, 1942

2,277,552

UNITED STATES PATENT OFFICE 2,277,552

AIR CONDITIONER

George A. Kneedler, Vernon, Tex., assignor of one-third to Charles N. Hobson and one-third to Eugene H. Judd, both of Vernon, Tex.

Application August 7, 1939, Serial No. 288,873

3 Claims. (Cl. 261—36)

This invention relates to an improved air conditioner for automobiles of the closed body type, and has more particular reference to an apparatus of this kind adapted to supply cool clean air to the interior of the automobile body in warm weather, and which may be quickly modified for use in circulating and heating the air in the automobile body in cold weather.

The primary object of the present invention is to provide an apparatus of the above kind which is comparatively simple and durable in construction, efficient in use, easy to install, and otherwise well adapted to meet with the requirements for a successful commercial use.

Briefly described, the present invention contemplates the provision of a casing secured to the dash board of the automobile at the front of said dash board and having air inlet and air outlet openings in the rear wall thereof registered with similar openings in the dash board. Means is provided for temporarily closing the air inlet openings of the dash board and casing, and the casing has a removable vertical transverse partition of foraminous material defining a rear compartment in which is arranged excelsior or similar absorbent material through which the air must flow in passing to the interior of the automobile through the outlet openings of the casing and the dash board. The front wall of the casing is also of foraminous material to permit passage of the air therethrough as it is conducted rearwardly to the casing by a conduit extending forwardly in proximity to the fan of the engine cooling system of the automobile. Means is provided for continuously supplying water to the absorbent material so as to maintain the same in a saturated condition for moistening and cooling the air passing therethrough. A fan is provided which is adapted to be mounted at the air inlet opening of the casing upon removal of the temporary closure thereof, for closing the front of the casing, and for installing a heater in the bottom of the casing upon removal of the partition and the absorbent material, whereby the device may be converted for use as a heater in a ready and expeditious manner. When so converted, the fan will force air from the interior of the automobile body into and through the casing past the heater and then out of the casing back to the interior of the automobile body.

The present invention consists more particularly in certain novel features and details of construction hereinafter more fully described, shown in the accompanying drawings and claimed.

In the drawings:

Figure 6 is a view similar to Figure 3 with the device modified for use as a heater; and Figure 7 is a fragmentary vertical section on line 7—7 of Figure 6.

Figure 5:
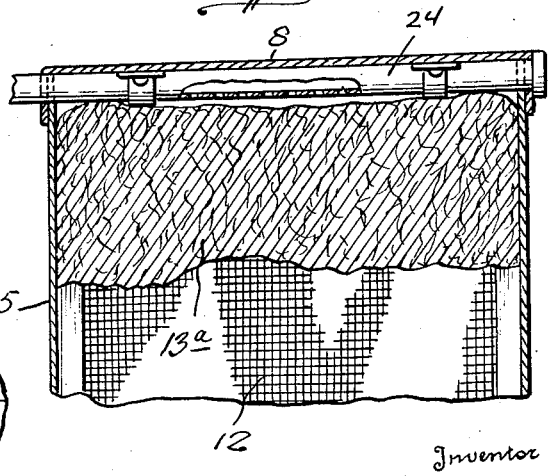
Figure 5 is a fragmentary vertical section on line 5—5 of Figure 3.
Figure 3:
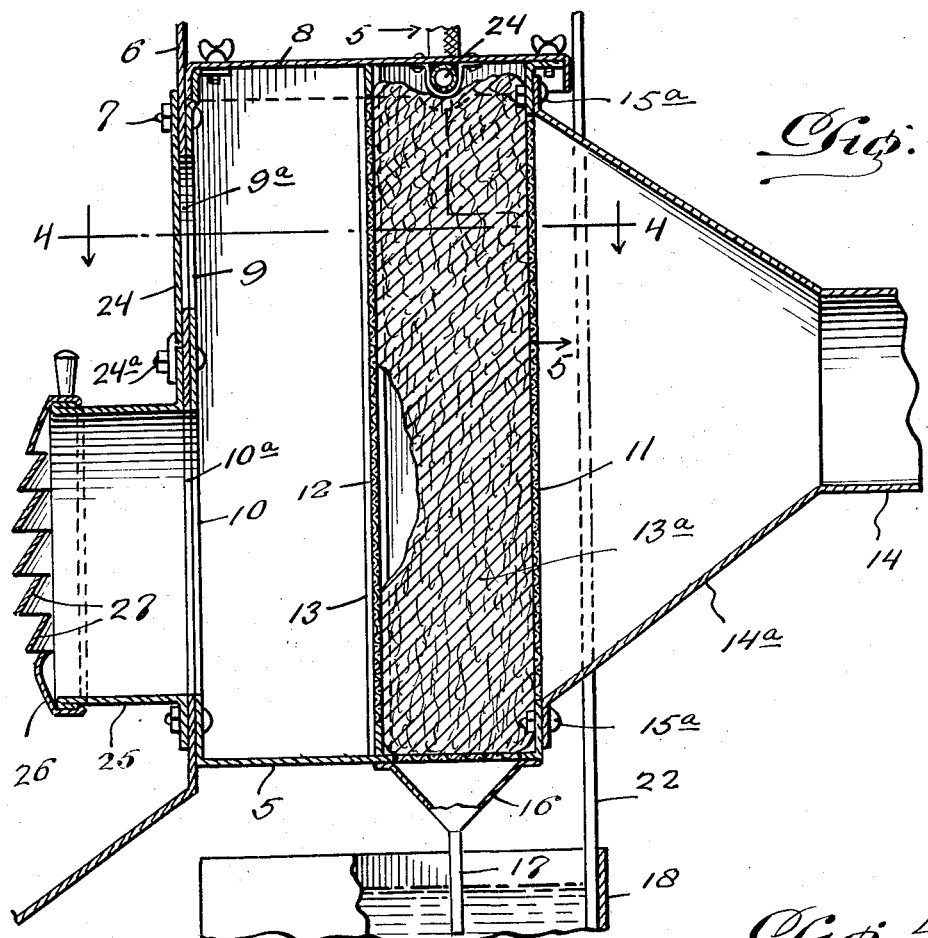
Figure 3 is an enlarged fragmentary vertical section through the casing of the apparatus and adjacent parts.
Figure 4:
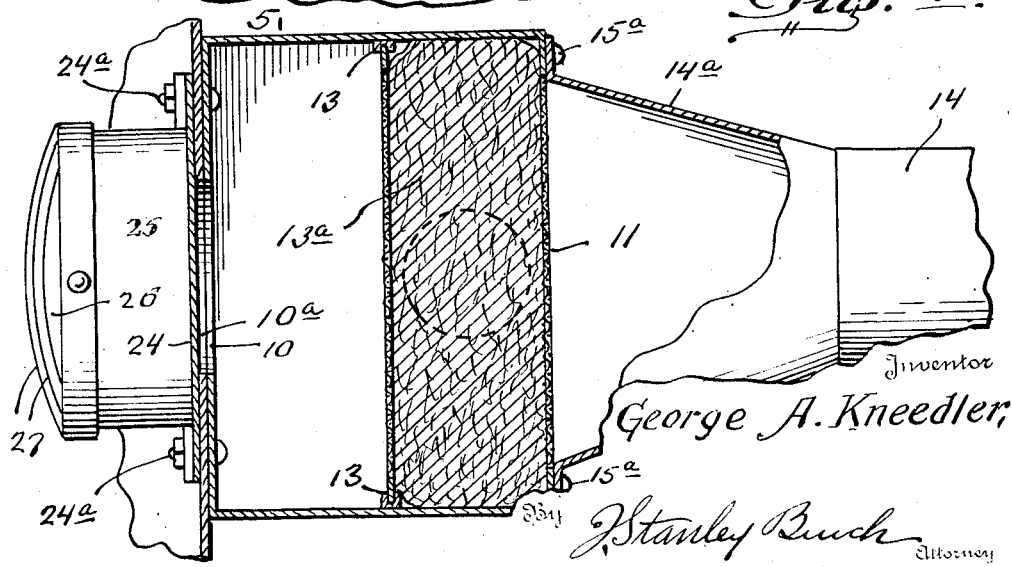
Figure 4 is a horizontal section on line 4—4 of Figure 3.

Referring in detail to the drawings, 5 indicates a rectangular casing which is rigidly secured to the dash board 6 of the automobile at the front of said dash board and by suitable means such as bolts 7 or the like. This casing has a removable lid 8 and is provided in the rear wall thereof with an upper air inlet opening 9 and a lower air outlet opening 10 registered with similar openings 9a and 10a provided in the dash board 6. Casing 5 also has a foraminous front wall 11 and a foraminous vertical transverse partition 12 removably engaged in guideways 13 provided on the side walls of the casing. Partition 12 thus divides the casing into a rear compartment which is filled with excelsior or other suitable porous absorbent material 13a. A conduit 14 is provided for conducting air to the front of the casing from a point immediately rearwardly of the fan 15 forming part of the engine cooling system of the automobile, and this conduit has a flared rear end portion 14a bolted to the front of casing 5 as at 15a. Conduit 14 further has a flared or funnel-like forward end portion 14b adapted to receive a portion of the air directed rearwardly by the fan 15 so that it may be conducted to the casing 5. At the bottom of the front compartment or chamber of casing 5 the latter is provided with a sump 16 having a bottom drain pipe 17 depending into a water storage tank 18 suitably mounted on the automobile directly beneath the casing 5. Means is provided for pumping the water from tank 18 and discharging it onto the absorbent material 13 so as to keep the latter properly saturated for humidifying and cooling the air delivered to the casing 5 by the conduit 14 before it passes through said casing and out of openings 10 and 10a into the interior of the automobile body. As shown, said pumping means preferably consists of an ordinary vacuum tank 19 operating on the same principle as that commonly used on automobiles for supplying gasolene from the main gasolene supply tank to the carburetor. This vacuum tank is connected by a line 20 with the intake manifold 21 of the automobile engine to derive suction therefrom whereby the water in tank 18 will be drawn at proper intervals into the vacuum tank 19 through water inlet pipe 22 into the vacuum tank 19 so as to keep the latter filled to a desired level with water. Water inlet pipe 22 extends from within the tank 18 below the level of the water in the latter to the top of the vacuum tank 19 as shown clearly in Figure 1, and said vacuum tank also has a bottom water outlet pipe 23 connected to a perforated outlet pipe or nozzle 24 secured to and across the underside of the lid 8 of casing 5 so as to extend across the top of the absorbent material 13 as clearly shown in Figures 3 and 5. In this way, a continuous supply of water will be had in the tank for flowing by gravity through the outlet pipe 23 and nozzle 24 into the top of the front chamber containing the absorbent material 13 so that the latter will be maintained in a moist condition. Excess water will of course be caught in the sump 16 and returned to the storage tank 18 through the drain pipe 17. When the device is used as thus far described so as to supply cool clean air to the interior of the automobile body, the openings 9 and 9a of the casing 5 and dash board 6 are temporarily closed by suitable means such as a cover plate 24 bolted to the rear side of the dash board 6 over said openings by certain of the bolts 7 and other bolts 24a. Thus, a portion of the air delivered rearwardly by the fan 15 will be conveyed by conduit 14 to the casing 5 so as to pass rearwardly through the foraminous front wall 11, absorbent material 13 and foraminous partition 12. In passing through the absorbent material 13, the air will be moistened and cooled as well as cleansed before it ultimately discharges through the openings 10 and 10a into the interior of the automobile body. The tank 18 may, in practice, be suitably covered, and the supply of water may be replenished therein from time to time as found necessary. An air discharge conduit 25 is bolted or otherwise attached to the dash board 6 at the rear side of the latter and in registry with the air outlet openings 10 and 10a, and swiveled on the rear end of this conduit 25 is a cap 26 provided with louvres 27 arranged to direct the rearwardly discharged air laterally. The louvre cap 26 may be rotarily adjusted on the discharge conduit 25 so as to direct the air downwardly, upwardly or to either side as may be preferred.

Figure 1:
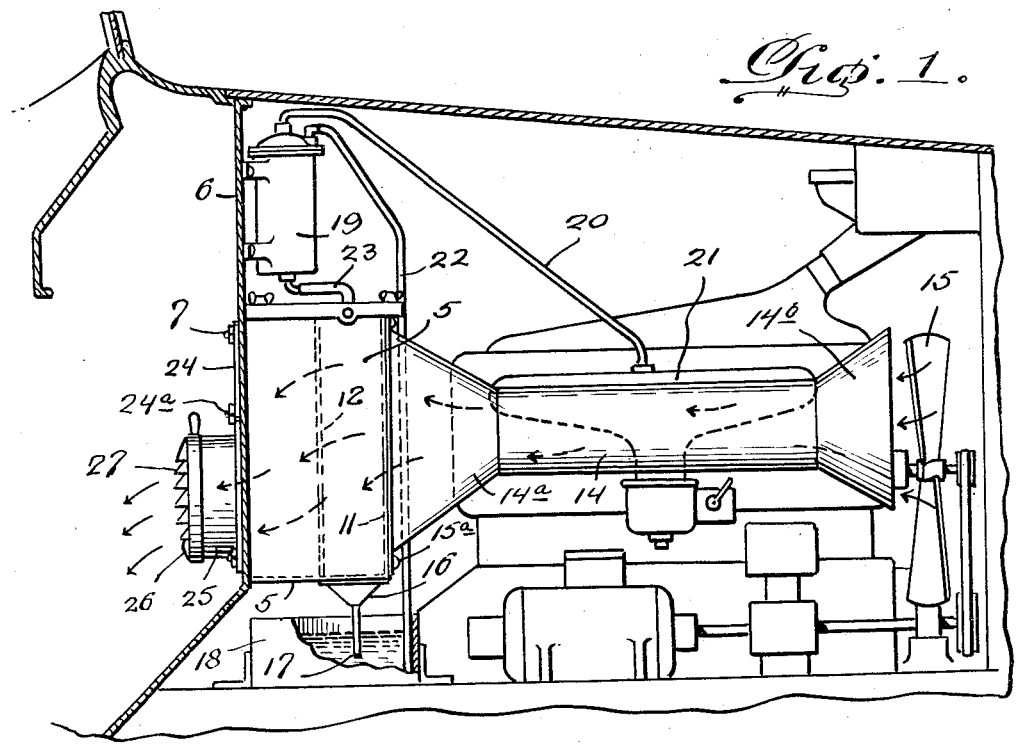
Figure 1 is a fragmentary view of the forward portion of an automobile equipped with an air conditioning apparatus constructed in accordance with the present invention and in use for supplying cool clean air to the interior of the automobile body, the apparatus being in side elevation and partly broken away and in section.
Figure 2:
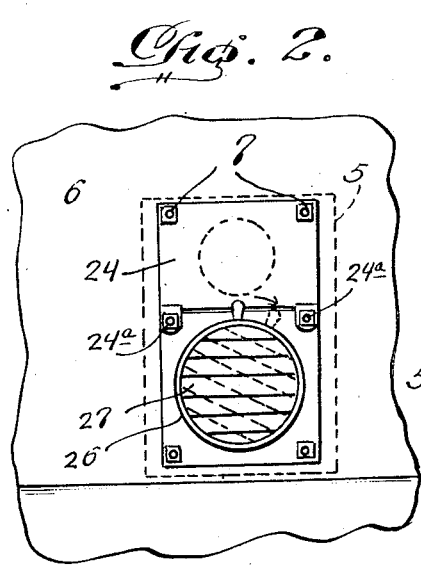
Figure 2 is a fragmentary rear elevation looking toward the air outlet of the apparatus shown in Figure 1.

As installed according to the foregoing description, the apparatus will be found of very good service in ventilating the interior of the automobile in warm weather. However, it is contemplated to provide for readily converting the apparatus into a heater for circulating and heating the air in the body of the automobile during cold weather. In making this change, the foraminous partition 12 is removed along with the closure plate 24, and the foraminous front wall of the casing 5 is closed or covered by means of an imperforate sheet or plate 28 inserted in the casing 5 and bolted or otherwise secured against the foraminous front wall of said casing 5 as shown generally in Figure 6. A fan unit 28a is then bolted to the dash board 6 in line with the openings 9 and 9a, preferably by the same bolts which were utilized to retain the closure plate 24 in place. This fan unit 28 is adapted to draw the air from the interior of the automobile body and force the same into the casing 5 through the openings 9 and 9a and then outwardly through the openings 10 and 10a and discharge conduit 25 back into the interior of the automobile body. In this arrangement, a suitable air heating device is installed in the lower portion of casing 5 as at 29 past which the air may flow for being heated immediately prior to being discharged back into the interior of the automobile body. This heating device is preferably of the well known hot water type having vertical water tubes connecting top and bottom headers adapted to be respectively secured to the appropriate portion of the water cooling system of the automobile engine as is generally well known in the art. For this purpose, the heater has a bottom water inlet nipple 30 adapted to be connected by a pipe 31 with the water cooling system and a top water discharge nipple 32 adapted to be connected with said water cooling system by means of a pipe 33. As the way these particular connections are made is generally well known and old in the art, they are neither specifically shown nor described. In installing the heating device 29, it must be readily removable for converting the apparatus back for use as shown in Figure 1, and suitable pads 34 and 35 are placed between the walls of the casing 5 and appropriate portions of the heating device so as to prevent marring of the casing or heating device and to insure proper flow of the air past the water tubes of said heating device between the top and bottom of the latter. Also, the lower pad 35 extends across the sump 16 so as to cover the latter at this time. When used as a heater, the device will of course be modified so as to render the water pumping means inoperative. This may be accomplished by disconnecting the suction pipe or line 20 from the intake manifold 21 of the engine.

From the foregoing description, it is believed that the construction and operation, as well as the advantages of the present invention, will be readily understood and appreciated by those skilled in the art. It will be seen that I have provided a very simple and efficient apparatus for the intended purpose which may be readily installed as well as conveniently converted for either of the intended uses. While I have illustrated and described what is at present believed to be a preferred embodiment of the invention, it will be apparent that minor details may be changed without departing from the spirit and scope of the invention.

What I claim as new is:

1. In combination with the dash board of a motor vehicle having an opening therein, a casing secured to the dash board at the front of the latter and having a rear wall provided with an opening registered with said opening in the dash board, said casing having a foraminous front wall, a foraminous partition dividing the casing into a front compartment, a filling of porous absorbent material in said front compartment, said casing having a sump at the bottom of said front compartment and a drain pipe depending from said sump, a water storage tank below said casing into which said drain pipe extends, pumping means for transferring water from said tank and discharging the same onto said porous absorbent material to maintain the same in a moistened condition, and a conduit connected with the front of the casing for collecting air and delivering it rearwardly into the casing from a point in proximity to the fan of the engine cooling system of the motor vehicle, said pumping means comprising a vacuum tank mounted above the casing and having a suction line leading to the intake manifold of the vehicle engine, a water supply line extending from the water storage tank to the vacuum tank, a bottom water discharge line for the vacuum tank, and a perforated water outlet nozzle extending across the top of said casing and the porous absorbent material and connected to the water outlet of said vacuum tank.

2. An apparatus for humidifying the air in the passenger compartment of an automobile, comprising an evaporating pad, means to pass a stream of air through said pad and discharge the same into said passenger compartment, a reservoir positioned to receive water running off said pad, a vacuum driven circulator for withdrawing water from said reservoir and delivering it to the top of said pad, comprising a conduit from the vacuum intake of said circulator to a vacuum point on the engine of said automobile.

3. Apparatus for humidifying air in the passenger compartment of an automobile, comprising a porous water retaining member, means to pass a stream of air through said member and discharge the same into said passenger compartment, a reservoir positioned to receive water running off said member, a vacuum driven circulator for withdrawing water from said reservoir and delivering it to the top of said member, comprising a conduit from the vacuum intake of said circulator to a vacuum point on the engine of said automobile.

GEORGE A. KNEEDLER.